Sept. 21, 1965 M. ÖVROM SEM 3,207,681
PROCESS OF EXHAUSTING GASES FROM FURNACES FOR
PRODUCTION OF ALUMINUM BY MELT-ELECTROLYSIS
Filed March 9, 1961
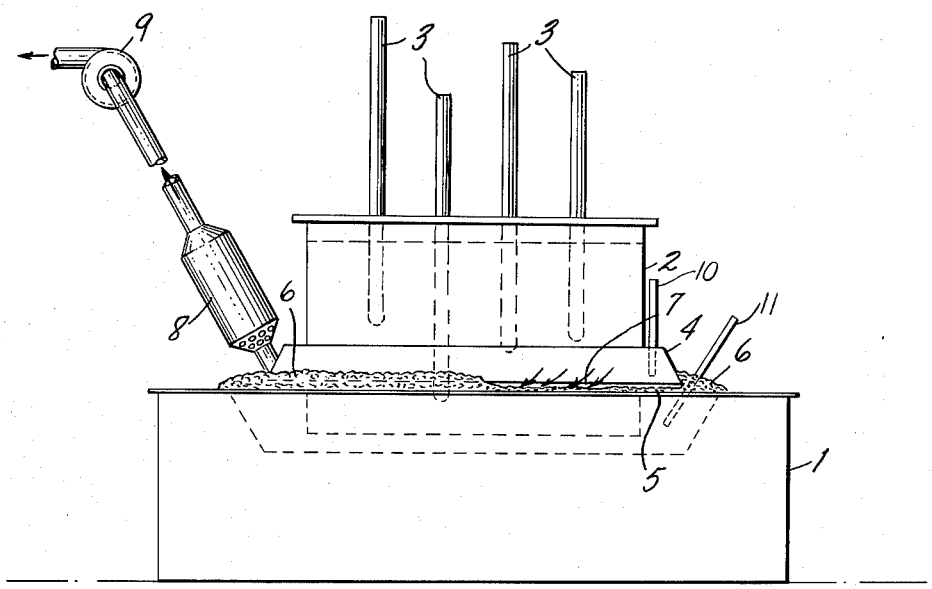
INVENTOR.
MATHIAS ÖVROM SEM
BY
*Eyre, Mann & Lucas*
ATTORNEYS.

3,207,681
PROCESS OF EXHAUSTING GASES FROM FURNACES FOR PRODUCTION OF ALUMINUM BY MELT-ELECTROLYSIS
Mathias Övrom Sem, Smestad, Oslo, Norway, assignor to Elektrokemisk A/S, a corporation of Norway
Filed Mar. 9, 1961, Ser. No. 94,469
Claims priority, application Norway, Mar. 19, 1960, 135,103
7 Claims. (Cl. 204—67)

This invention relates to the operation of furnaces for the reduction of alumina to aluminum of the general type shown in Jouannet U.S. Patent 2,526,875. It will be noted that this furnace comprises a pot in which the alumina is reduced when dissolved in molten cryolite (sodium aluminum fluoride) and into which an anode enters. The anode is suspended by vertical studs and members are supplied which form a gas duct around such electrode. The members forming such gas duct will as a rule be from 2 to 5 cm. above the layer of the crust on the bath and the space between the lower edge of such members and the crust is ordinarily sealed by means of aluminum oxide. Gases generated in the furnace will comprise carbon monoxide and carbon dioxide and ordinarily this will carry with it certain amounts of fluorine from the bath. Also the gas will include vapors resulting from the decomposition of the tars used as binders for the electrode. Some other gases in small amounts may also be present.

Ordinarily the gases are allowed to escape through the gas collecting ducts and pass out to a burner where the tar vapors and carbon monoxide are burned with air and the residue passes to a gas cleaning station where fluorine compounds are removed. In such operation it is ordinarily considered essential that care be taken so that a minimum of air will be drawn in with the furnace gases before reaching the burner as such air will increase the volume of gas to be conducted to the burner and also the presence of air may create explosive mixtures.

In regular operation of the furnace it is necessary either from time to time or continuously to add aluminum oxide to the bath. To do this the crust around and outside of the gas collecting channel must be broken at one or more places. Such breaking of the crust and charging is usually carried out every 4 to 8 hours and in operation ordinarily takes from 5 to 10 minutes. Even in furnaces where the aluminum oxide is charged continuously the crust has to be broken periodically so that the oxide may be mixed into the bath. During these operations the bath will be left more or less uncovered and as the development of fluorine increases strongly when the amount of aluminum left in the bath is low (i.e., just before the new oxide is added), the gas released during this charging period will contain much fluorine and tend to poison the atmosphere of the furnace room and injure surrounding vegetation if it escapes.

Another impurity that interferes with the operation of the furnace is due to disintegration of the carbon electrode. It frequently occurs that the binder used in making the electrode is consumed more rapidly than the coke forming the body of the electrode. As a result dry coke grains gradually become detached from the bottom surface of the anode and float on the surface of the bath as soot. This has to be removed from time to time, but when the soot is skimmed off an appreciable amount of the bath itself is removed so that this causes economic loss as well as additional labor.

I have found that both of these problems can be met simultaneously by supplying means so that there is a relative suction on the line that withdraws the gas from the gas ducts and having this suction controlled so that an appreciable but limited amount of air is drawn into the system whenever the crust is broken. Since the breaking of the crust only occurs intermittently, the amount of air can be kept small enough so that there is little risk of explosion but at the same time the suction will be exerted at the edges of the crust where it is broken to prevent fluorine escaping into the room. I have also found that the air drawn in under the crust in this way contacts the floating soot or carbon on the bath and causes it to burn and thereby the necessity of skimming such soot off the bath is greatly lessened or entirely eliminated.

Ordinarily the suction necessary to accomplish this result is created by a fan placed beyond the burner used for burning the tars and in fact the whole gas collecting system for a plant may be operated at reduced pressure. Of course air may be blown in under slight pressure to accomplish the same result and in place of air one may use air enriched with oxygen or oxygen itself or an oxygen generating substance such for example as $Na_2O_2$ or $Na_2CO_3$. In short, oxidizing gas containing from about 20% (air) to 100% oxygen by volume may be used in the process.

As regards the amount of air that is to be drawn into the system, I have found that in ordinary operation where the crust is broken intermittently to charge in additional alumina, satisfactory results can be had if the suction is great enough so that during such period it will draw in from 2 to 3 N/L (normal liters) of air per second per 1000 amperes of furnace load. This will mean that the amount of air drawn in will be 2 to 3 times the normal withdrawn from the system, but it is to be remembered that this occurs only intermittently and for a short period of time. Actually since the break in the crust only lasts about 10 minutes and rarely occurs any more than every 4 hours, it will follow that the aggregate amount of air drawn into the system will average less than about 600 N/L per hour per 1000 amperes of furnace load.

If a continuously operating charging mechanism is used, the amount of air drawn in per second can be greatly reduced as the total period during which the crust is open may be longer, but again the average should be within the limits given above. Actually, in accordance with my invention it may be desirable to maintain a small area of the bath open at a point remote from that at which the gas is withdrawn and continuously suck air in from that point. However, ordinarily it will not be necessary to maintain the break in the crust open at all times for I have found that soot will be burned if the opening is maintained for a maximum of 1 to 2 hours at a time, and I have found that valuable results can be had if the average amount of air drawn into the system is between about 50 and 600 N/L per hour per 1000 amperes of furnace load. The air may be brought into the furnace either through an opening in the crust or through a pipe leading through the crust or through a pipe leading into or through the outer wall of the gas duct.

By keeping the suction sufficient so that the amount of air drawn in is within these limits, there is virtually no danger of explosion but the floating soot will be largely burned and the amount of fluorine introduced into the air of the furnace room will be greatly reduced.

The operation of the invention is illustrated in the appended diagrammatic drawing which shows a side view of an aluminum furnace. In this drawing 1 is the furnace pot; 2 is the anode to which current is supplied by the vertical contact rods 3. The lower part of the anode is surrounded by a gas duct 4 which is sealed to the crust 5 of the furnace by aluminum oxide indicated at 6. At the point indicated at 7 the crust is broken so that aluminum oxide is introduced into the bath and air can enter at this area as described above. 8 indicates the usual burner where the furnace gas ordinarily will be burned with air to eliminate tars before being led to the cleaning point. 9 indicates a fan ordinarily at some remote point which will put suction on the line so that the pressure in the gas duct 4 will be slightly less than atmospheric, and 10 and 11 indicate pipes that pass through the wall of the gas duct and the crust respectively which may be used to bring the air into the furnace.

A furnace such as described having a furnace load of 50,000 amperes was operated so that the crust 6 of the furnace was broken on an average of every six hours and an opening such as shown at 7 was left open for about 10 minutes while the furnace was being charged. The fan 9 was operated to draw in about 150 N/L of air during the time that the break in the crust remained open and it was found that no explosion took place and the aggregate amount of gas to be handled was not unduly increased but nevertheless most of the floating soot or carbon was consumed and very little fluorine was released into the air of the furnace room.

It is understood that the example is given only by way of illustration.

I claim:

1. In the operation of an aluminum smelting furnace which includes a pot, a molten electrolytic bath therein containing dissolved aluminum oxide, a carbonaceous anode descending into the pot, a duct around the lower portion of the anode for collecting gases evolved during smelting which includes means for withdrawing such gases from the duct and a solidified crust positioned in the space between the walls of said duct and pot to prevent escape of smelting gases through said space, the method which comprises the steps of establishing during furnace operation a flow of oxidizing gas containing from about 20% to 100% oxygen by volume into the pot below the crust and burning in said flow of oxidizing gas carbon particles floating on the surface of the molten bath formed as a result of disintegration of the anode, said flow of oxidizing gas being established in the case of 20% oxygen concentration at a rate averaging from about 50 to 600 N/L per hour per 1000 amperes of furnace load and at equivalent rates when said oxidizing gas contains greater oxygen concentrations.

2. A method in accordance with claim 1 in which said flow of oxidizing gas is established periodically at intervals of every 4 to 8 hours.

3. A method in accordance with claim 1 in which said flow of oxidizing gas is established continuously.

4. A method in accordance with claim 1 in which said flow of oxidizing gas is established through the crust.

5. In the operation of an aluminum smelting furnace which includes a pot, a molten electrolytic bath therein containing dissolved aluminum oxide, a carbonaceous anode descending into the pot, a duct around the lower portion of the anode for collecting gases evolved during smelting which includes means for withdrawing such gases from the duct, a solidified crust positioned in the space between the walls of said duct and pot to prevent escape of smelting gases through said space, the method which comprises the steps of breaking the crust and supplying aluminum oxide to the bath through said break, establishing a flow of oxidizing gas containing from about 20% to 100% oxygen by volume into the pot through said break, and burning carbon particles in said flow of oxidizing gas floating on the surface of the molten bath as a result of disintegration of the anode, said flow of oxidizing gas being established in the case of 20% oxygen concentration at a rate averaging from about 50 to 600 N/L per hour per 1000 amperes of furnace load and at equivalent rates when said oxidizing gas contains greater oxygen concentrations.

6. A method in accordance with claim 5 in which the crust is broken and aluminum oxide is supplied to the molten bath through said break periodically at intervals of every 4 to 8 hours.

7. A method in accordance with claim 1 in which the break in the crust is maintained open for from about 1 to 2 hours.

References Cited by the Examiner

UNITED STATES PATENTS

| 2,526,875 | 10/50 | Jouannet | 204—67 |
| 2,593,741 | 4/52 | Ferrand | 204—246 |
| 2,631,972 | 3/53 | Luzzatto | 204—247 |
| 2,731,407 | 1/56 | Sem et al. | 204—67 |
| 2,943,985 | 7/60 | Sem | 204—67 |
| 3,006,825 | 10/61 | Sem | 204—67 |

FOREIGN PATENTS

| 1,007,069 | 4/57 | Germany. |
| 1,059,667 | 6/59 | Germany. |
| 301,504 | 11/54 | Switzerland. |

WINSTON A. DOUGLAS, *Primary Examiner.*

JOHN R. SPECK, JOHN H. MACK, *Examiners.*